(12) United States Patent
Goronzy et al.

(10) Patent No.: US 7,113,908 B2
(45) Date of Patent: Sep. 26, 2006

(54) METHOD FOR RECOGNIZING SPEECH USING EIGENPRONUNCIATIONS

(75) Inventors: Silke Goronzy, Fellbach-Schmiden (DE); Ralf Kompe, Fellbach (DE)

(73) Assignee: Sony Deutschland GmbH, Cologne (DE)

( * ) Notice: Subject to any disclaimer, the term of this patent is extended or adjusted under 35 U.S.C. 154(b) by 705 days.

(21) Appl. No.: 10/090,861

(22) Filed: Mar. 5, 2002

(65) Prior Publication Data

US 2002/0128820 A1   Sep. 12, 2002

(30) Foreign Application Priority Data

Mar. 7, 2001  (EP)  ................................. 01105704

(51) Int. Cl.
*G10L 15/06* (2006.01)
(52) U.S. Cl. ..................... 704/244; 704/255; 704/277
(58) Field of Classification Search ................ 704/244, 704/255, 277, 243, 245
See application file for complete search history.

(56) References Cited

U.S. PATENT DOCUMENTS

| | | | | |
|---|---|---|---|---|
| 5,127,055 A | * | 6/1992 | Larkey | 704/244 |
| 5,255,342 A | * | 10/1993 | Nitta | 704/200 |
| 5,268,990 A | * | 12/1993 | Cohen et al. | 704/200 |
| 6,253,181 B1 | * | 6/2001 | Junqua | 704/255 |
| 6,442,519 B1 | * | 8/2002 | Kanevsky et al. | 704/243 |

OTHER PUBLICATIONS

T. Shultz and A. Waibel, "Adaptation of Pronunciation Dictionaries for Recognition of Unseen Languages,"Proc. Specom, St. Petersburg, Russia, 1998, pp. 207-210.*

"Construction of Markov Word Models for Computer Recognition of Continuous Speech," IBM Technical Discolsure Bulletin, vol. 36, iss. 11, Nov. 1993, pp. 665-668.*

S. M. Witt and S. J. Young, "Bilingual Model Combination for Non-Native Speech Recognition, " Proc. Inst. of Acoust. Conf on Speech and Hearing, vol. 20, part 6, 1998, pp. 91-98.*

Strik H et al: "Modeling Pronunciation Variation for ASR: A Survey of the Literature" Speech Communication Elsevier Science Publishers, Amsterdam, NL, vol. 29, No. 2-04, Nov. 1999, pp. 225-246, XP001012517.

Rentzepopoulos P A et al: "Efficient Multilingual Phoneme-to-Grapheme Conversion Based on HMM" Computational Linguistics, Sep. 1996, MIT Press for Assoc. Compt. Linguistics, USA, vol. 22, No. 3, pp. 351-376, XP001012263.

Waibel A et al: "Multilinguality in Speech and Spoken Language Systems" Proceedings of the IEEE, Aug. 2000, IEEE, USA, vol. 88, No. 8, pp. 1297-1313, XP002172716.

Humphries J J et al: "The Use of Accent-Specific Pronunciation Dictionaries in Acoustic Model Training" Seattle, WA, May 12-15, 1998, New York, NY: IEEE, US, vol. Conf. 23, May 12, 2998, pp. 317-320, XP000854579.

Kat L W et al: "Fast Accent Identification and Accented Speech Recognition" Phoenix, AZ, Mar. 15-19, 1999, New York, NY: IEEE, US, Mar. 15, 1999, pp. 221-224, XP000898298.

* cited by examiner

*Primary Examiner*—Donald L. Storm
(74) *Attorney, Agent, or Firm*—Oblon, Spivak, McClelland, Maier & Neustadt, P.C.

(57) ABSTRACT

To increase the recognition rate and quality in a process of recognizing speech an approximative set of pronunciation rules (APR) for a current pronunciation (CP) of a current speaker is determined in a given pronunciation space (PS) and then applied to a current pronunciation lexicon (CL) so as to perform a speaker specific adaptation of said current lexicon (CL).

19 Claims, 4 Drawing Sheets

METHOD FOR RECOGNIZING SPEECH USING EIGENPRONUNCIATIONS

BACKGROUND OF THE INVENTION

1. Field of the Invention

The present invention relates to a method for recognizing speech and in particular to a method for recognizing speech using Eigenpronunciations.

2. Description of the Related Art

Methods and systems for recognizing speech of prior art severely suffer from the problem that the recognition rate generally strongly decreases in cases where speech in a target language to be recognized is uttered by a non-native speaker having a different source language as his mother or native tongue or language.

The reason for that is that conventional methods and systems for recognizing speech use pronunciations and pronunciation variants of native speakers of said target language, whereas the pronunciations of most people and in particular of non-native speakers often strongly deviate from the so-called canonical pronunciations of native speakers.

To manage the problem of decreasing recognition rates when recognizing speech in a given target language uttered by a non-native speaker it is common to enrich or enhance the dictionary or lexicon of the involved recognizer by adding non-native pronunciation variants or alternatives.

The commonly and conventionally involved different possible ways to obtain these alternatives or variants for non-native pronunciations are very difficult to perform and additionally they are very costly. Most conventional methods try to collect utterances in said target language which are uttered by non-native speakers who have said given source language as their mother or native tongue or language. Additionally, conventional methods try to cover all possible variants of pronunciations which are then included in the respective lexicon or dictionary. Therefore, the respective lexicon or dictionary contains manifolds of data which have to be evaluated during the process of recognition.

BRIEF SUMMARY OF THE INVENTION

It is therefore an object of the present invention to provide a method for recognizing speech which is easy to perform and which has high recognition rates even when target languages are uttered by non-native speakers.

The object is achieved by a method for recognizing speech according to the claims appended hereto. Preferred embodiments are within the scope of the respective dependent subclaims.

DETAILED DESCRIPTION OF THE INVENTION

Figure 1:
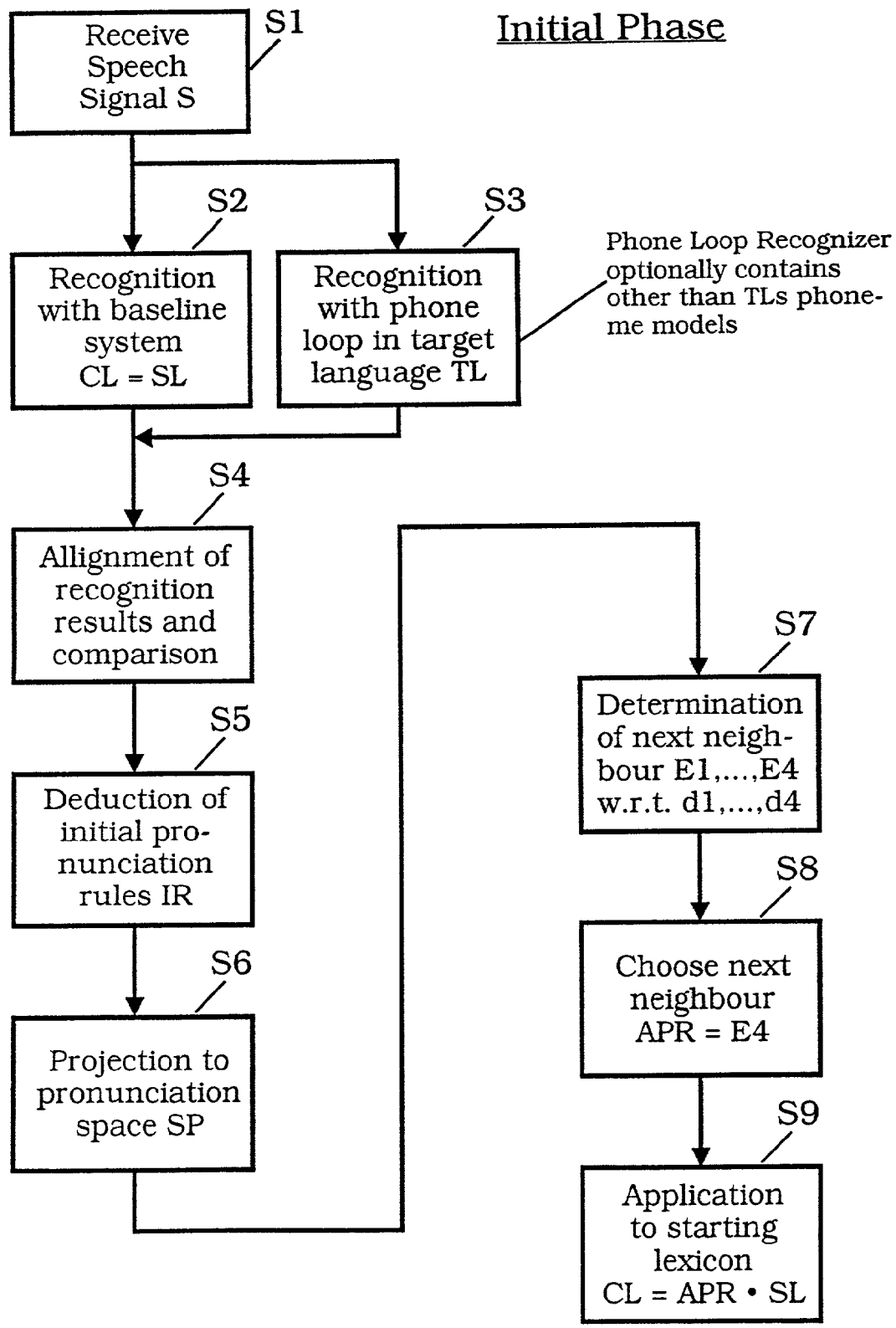
FIG. 1 is a schematical block diagram describing an initial sequence performed in an embodiment of the inventive method for recognizing speech.

In the method for recognizing speech according to the invention a pronunciation space of possible pronunciation rules and/or of sets thereof is provided. In said pronunciation space an at least approximative set of pronunciation rules is determined and/or generated. This is done in accordance with a current pronunciation and/or an accent of a current speaker. In the inventive method for recognizing speech a current lexicon of pronunciation variants is employed for the step of recognition. Said current lexicon is according to the invention adapted to the current speaker by applying at least said approximative set of pronunciation rules to it. Thereby, speaker specific pronunciation variants are at least included to said current lexicon.

It is therefore a key idea of the present invention to provide a space of possible pronunciation rules and/or of sets thereof. It is assumed that a limited number of pronunciation rules and/or of sets of pronunciation rules is sufficient to span or cover a whole space of possible pronunciations, the so-called pronunciation space. It is a further idea of the present invention to find at least an approximation for the current pronunciation of a current speaker. The approximation of the current pronunciation is located and/or derived from the pronunciation space and/or its elements. Therefore, with a limited number of given pronunciation rules and/or sets of pronunciation rules the complex variability of all pronunciations of possible speakers can be covered. To enhance recognition rates for the process of recognizing speech the derived approximative set of pronunciation rules for the current speaker is applied to the current lexicon to include speaker specific pronunciation variants to it.

Although it might be sufficient to carry out said speaker specific adaptation of the current lexicon in the very beginning of a new recognition session it might also be advantageous according to a preferred embodiment of the inventive method for recognizing speech that the step of adapting said current lexicon is carried out repeatedly, in particular after completed recognition steps and/or obtained recognition results. This enables the inventive method for recognizing speech to include further pronunciation variants to the current lexicon which might occur in later sections of the recognizing session.

Because of the same reasons according to another advantageous embodiment of the inventive method said step of determining and/or generating said approximative set of pronunciation rules is carried out repeatedly, so as to iteratively find an approximative set of pronunciation rules fitting better or best to the current pronunciation and/or accent of the current speaker, in particular to consider temporal variations of the current speaker's pronunciation and/or accent and/or in particular after completed recognition steps and/or obtained recognition results.

According to this measure it is possible to consider temporal variations of the speaking behavior of the current speaker. In the very beginning of the recognizing session, i.e. when the current speaker begins to speak, the voice and the pronunciation of the speaker might be different compared to later sections of his speech. This is probably true for a non-native speaker trying to speak a foreign target language, in particular as with time the exercise of former utterances leads to a fixed speaking behavior having pronunciation variants with a lower fluctuation rate.

The pronunciation space might be generated and/or provided in a preprocessing step, in particular in advance of a recognition process.

The pronunciation space is preferably derived from a plurality and/or limited number of so-called Eigenpronunciations.

These Eigenpronunciations are derived from, contain and/or are representative for certain and/or given pronunciation rules and/or sets thereof, in particular for at least one non-native speaker of at least one target language with at least one source language as a mother or native tongue or language. According to this measure it is possible to collect, e. g. in advance of the recognition process, a finite number of pronunciation variants or rules of different non-native speakers with different source languages as their mother or native tongue or language trying to speak different target languages. Therefore, a large variety of speaking behavior of non-native speakers may be covered by constructing said pronunciation space from said limited number of more or less isolated Eigenpronunciations as rules of pronunciations or sets of rules of pronunciations.

Although said pronunciation space once constructed and generated may be handled as being completed, it is also advantageous to enrich said pronunciation space by modifying it during the process of recognition, in particular after completed recognition steps and/or obtained recognition results. This might be done in particular by modifying said Eigenpronunciations.

It is of further advantage that according to a further preferred embodiment of the inventive method said step of determining and/or generating said approximative set of pronunciation rules comprises a step of determining a pronunciation-related position of a current speaker in said pronunciation space, in particular in accordance with a current pronunciation and/or accent of said current speaker. According to that measure said pronunciation space is handled as a more or less abstract entity in which said Eigenpronunciations form a discrete set of points and/or areas. Accordingly, the current pronunciation and/or accent of the current speaker can be compared to these isolated or discrete points or areas in pronunciation space. According to that comparison the current pronunciation can be located in the vicinity of said Eigenpronunciations in said pronunciation space.

Accordingly, it is of further advantage to choose said approximative set of pronunciation rules as a given set of pronunciation rules in said pronunciation space, in particular as a given Eigenpronunciation thereof, which is a next neighbor of the speaker's current pronunciation, in particular with respect to said pronunciation-related position.

It is therefore preferred, to evaluate said property of being a next neighbor of said pronunciation-related position by means of a certain given measure or distance function, in particular by an Euclidean distance, in said pronunciation space.

Instead of choosing a next neighbor of said pronunciation-related position as an approximative set of pronunciation rules for the current pronunciation of the current speaker, it is preferred to choose a weighted mixture, superposition and/or the like of given pronunciation rules, sets, derivatives and/or components thereof which are located in said pronunciation space and which are in particular based on said Eigenpronunciations. This measure ensures in particular a large variability in choosing an appropriate approximative set of pronunciation rules to approximate the current speaking behavior and the current pronunciation or accent of the current speaker.

It is of further advantage that said current lexicon is in each case at least partially based on and/or derived from a starting lexicon or initial lexicon, in particular on a canonical lexicon, the latter containing essentially canonical pronunciation variants of native speakers of a given target language and/or in particular in the case of changing to a different and/or new speaker. It is therefore possible, in particular in the case of the different and/or new speaker with a new recognizing session, to start with a clean and unmodified lexicon which only contains canonical pronunciation variants of native speakers and then to modify these canonical pronunciation variants in accordance with an actual and current speaking behavior and pronunciation of the current speaker.

According to a further preferred embodiment of the inventive method the step of determining and/or generating said approximative set of pronunciation rules is at least partially based on and/or derived from a comparison of a current pronunciation of said current speaker with a canonical pronunciation, in particular with respect to a given utterance, recognition result and/or the like and/or in particular in the beginning of a recognition session with a different and/or new speaker. Therefore, a very simple comparison can be realized by comparing the current and actual pronunciation of the current speaker with a canonical pronunciation.

It is therefore of further advantage to base said comparison essentially on a recognition step using said starting lexicon or canonical lexicon as said current lexicon.

Said comparison can be carried out preferably by at least repeating one recognition step using a phone or phoneme recognizer or the like, so as to yield a sequence of actually uttered phones, phonemes, or the like.

Alternatively or additionally for said comparison the pronunciation of said current speaker is compared to a canonical pronunciation, in particular so as to generate a set of pronunciation rules and/or to locate the pronunciation-related position of the current speaker in said pronunciation space.

To further increase the rate and the quality of the recognition process it is advantageous according to a further embodiment of the present invention to remove unnecessary information with respect to the process of recognition and in particular with respect to already recognized results and/or the current pronunciation from said current lexicon. Therefore, it is useful to remove certain pronunciation variants which are not covered by the speaking behavior and the current pronunciation of the current speaker. It is for instance helpful to remove pronunciation variants of non-native speakers which have different source languages as their mother or native tongue or language than the current speaker unless they are needed for constructing said approximative set of pronunciation rules.

To cover as good as possible the whole variability of pronunciations the inventive method may be designed for a plurality of source languages and/or of target languages, in particular with respect to the Eigenpronunciation space.

Further aspects of the present invention may become apparent from the following remarks:

The recognition of non-native speech imposes big problems to nowadays speech recognition systems.

Usually recognition rates decrease drastically when non-native speakers speak in a foreign target language. The reason for that is that the non-native pronunciation variants often severely deviate from the expected native one. In order to cope with this problem, conventional recognizers possess enhanced and enriched dictionaries or lexica which include non-native pronunciation alternatives and variants. As the different conventional possible ways to obtain these alternatives or variants are very costly, the inventive method for deriving pronunciation alternatives or variants, in particular for non-native speakers, starts from a limited number of given pronunciation rule-sets to construct a pronunciation space in which a current pronunciation can be located in an approximative way.

It is therefore assumed, that pronunciation rule-sets for a limited number of source languages and/or target languages is available. These sets of pronunciation rules are called Eigenpronunciations in said pronunciation space.

Within that context the target language is the language a speaker tries to speak, whereas a source language is a native or a mother tongue language of the speaker.

It is further assumed within the context of this invention that the so derived Eigenpronunciations span and/or cover a space of possible accented pronunciations or pronunciation rules and that each speaker can be characterized by an localized respective accent or the manner of pronunciation in this space.

When a new speaker starts using a system incorporating the inventive method it is necessary that the speech recognition system provides a reliable recognition result which can be achieved by using certain confidence measures to judge how reliable the recognition result is. This initial recognition step is conducted on the basis of a lexicon which contains a standard pronunciation, i. e. a canonical pronunciation of the target language only.

The same utterance or utterances is/are then re-recognized employing a phone loop recognizer or the like. The so derived recognition result is considered as the sequence of phonemes or phones as it is uttered by the speaker. From this result one or several rules are derived characterizing the difference between the speaker's pronunciation and the standard or canonical pronunciation.

In order to achieve fast improvements it is necessary to generalize the observed or current pronunciation variation to the whole lexicon. These initially derived rules or variants are used to compute the pronunciation-related location or position of the speaker's current pronunciation in the Eigenpronunciation space and to determine the rule-set that is closest to the speaker or the approximative set of pronunciation rules, respectively. The then derived approximative set of pronunciation rules is used to modify the current lexicon for the specific speaker.

In addition to selecting the closest rule-set, it is also possible not to choose a complete set of rules but to select specific rules from one or different rule-sets or alternatively a combination of existing rules, thus constructing a new rule-set that is specific to the current speaker. Doing so it would be possible to account for the strength of the accent by selecting and/or weighting rules accordingly.

It is important to account for the strength of the accent because someone who does not speak a foreign language at all will tend to replace all phonemes or phones of the target language by phonemes or phones of his own source or mother language, whereas someone who can speak a little of the target language will replace only some of the phonemes or phones by phonemes or phones of his own source or mother language.

It is a particular advantage of the present invention that for the proposed approach only a limited number of initial pronunciation rules or rule-sets as Eigenpronunciations is necessary to deal with variant kinds of dialects and accents. It is not necessary anymore in contrast to prior art approaches to design a new rule-set for each new source and target language and in particular for each new speaker.

Additionally, according to the invention the whole lexicon is adapted to specific speaker behavior with a very small amount of accent data.

It is a further aspect of the present invention to provide a system, an apparatus, a device and/or the like for recognizing speech which is in each case capable of performing the inventive methods for generating pronunciation variants and/or rules and/or for recognizing speech.

According to a further aspect of the present invention a computer program product is provided, comprising computer program means which is adapted to perform and/or realize the inventive method for recognizing speech when it is executed on a computer, a digital signal processing means and/or the like.

In the following further advantages and aspects of the present invention will be described taking reference to the accompanying figures.

The schematical block diagram of FIG. 1 shows an initial phase of the inventive method for recognizing speech.

In a first step S1 a speech signal S is received. In following and independently performed steps S2 and S3 said received speech signal S is subjected to two different recognition processes. In step S2 recognition is performed with respect to a base line system, i. e. a starting lexicon SL is used as said current lexicon CL and does contain only canonical pronunciation information. Additionally, the recognition result of step S2 may be qualified with respect to its recognition quality by means of a confidence measure, or the like. In step S3 recognition is performed with respect to a phone loop recognizer regarding said target language TL, which may optionally also contain phoneme models of languages other than said target language TL.

In step S4 the recognition results of S2 and of S3 are compared and e.g. aligned with respect to each other so that initial pronunciation rules IR can be derived or deduced from the alignment and comparison of step S4 in step S5. Derived initial pronunciation rules IR are projected and transformed into the given pronunciation space SP in step S6. By means of the particular projection process the position or localization of the current pronunciation CP is obtained in said pronunciation space PS. The projection could also be done by directly using the phoneme recognizer output.

In the following step S7 the neighbourhood of the initial pronunciation rules and/or of the current pronunciation CP is explored to determine the closest next neighbor out of next neighbours E1, . . . E4 with respect to distances d1, . . . d4. The next neighbours E1, . . . E4 are Eigenpronunciations which span at least a part of the constructed pronunciation space PS.

In the next step S8 the closest next neighbor, in the example of the FIGS. E4, is chosen as an approximative set of pronunciation rules APR.

The so derived approximative set of pronunciation rules APR of step S8 is in step S9 applied to the current lexicon CL, and according to the example of FIG. 1, it is applied to the starting lexicon SL.

Figure 2:
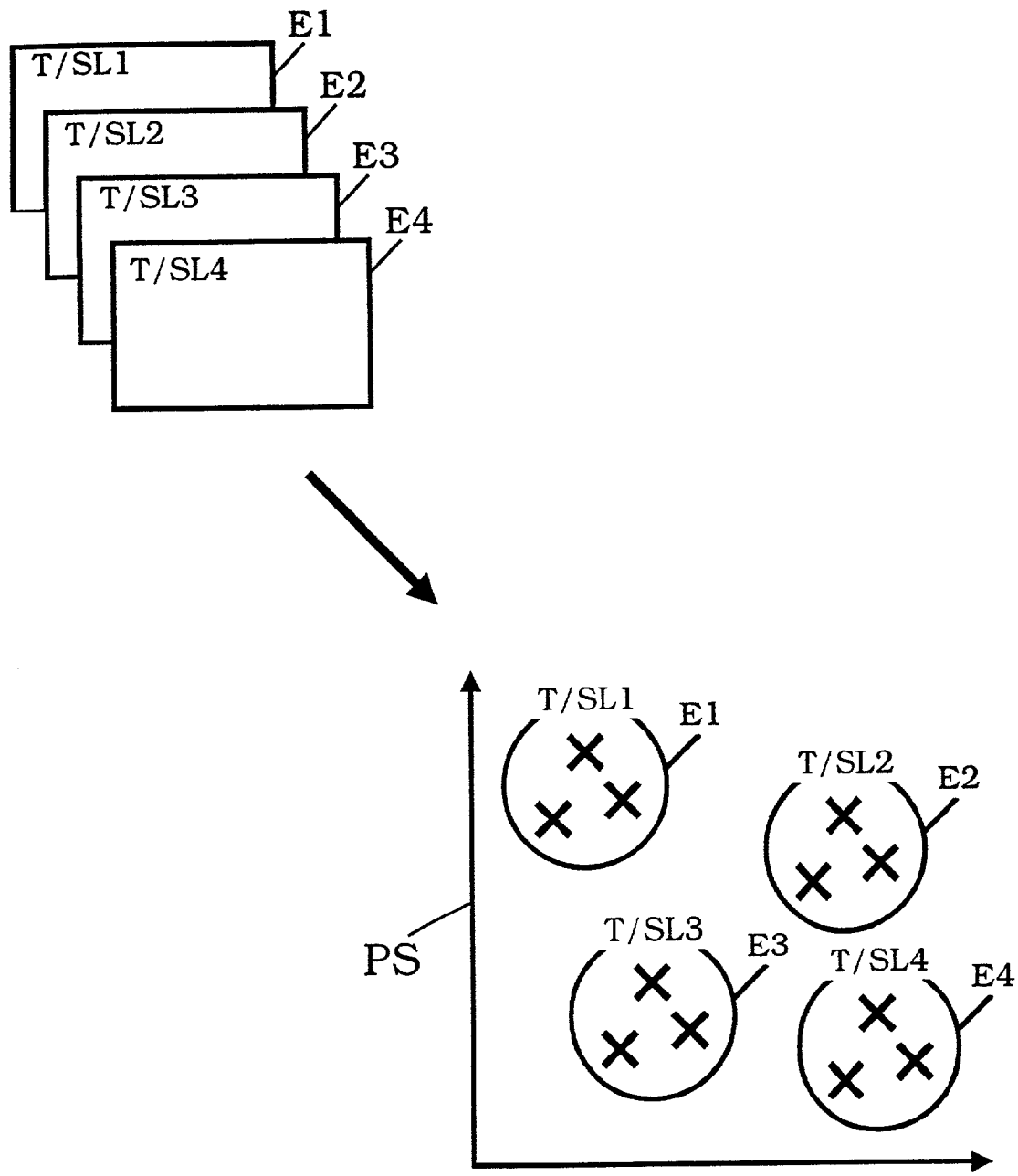
FIG. 2 is a schematical diagram showing the construction of the pronunciation space according to an embodiment of the invention.

FIG. 2 demonstrates in a schematical way the construction of the pronunciation space PS. Starting point is the provision and/or generation of sets of pronunciation rules which are referred to as Eigenpronunciations E1, . . . , E4. These Eigenpronunciations E1, . . . , E4 belong, in the example of FIG. 2, to a given single target language TL with respect to four different foreign source languages SL1, . . . SL4. These sets of rules E1, . . . , E4 may be obtained and derived from the speech of four different classes of speakers with each class of speakers having one of the four different source languages SL1, . . . , SL4 as their mother or native tongue or language and which try to speak the given single target language TL:

The obtained Eigenpronunciations E1, . . . E4 serve as starting points or starting surroundings for constructing or spanning the pronunciation space or Eigenpronunciation space PS. The Eigenpronunciations E1, . . . , E4 are located somewhere in said pronunciation space PS and with respect to each other. Said Eigenpronunciations E1, . . . , E4 may overlap as may be obvious by comparing similar languages as for example German and Dutch or as comparing different dialects in one and the same language.

Figure 3:
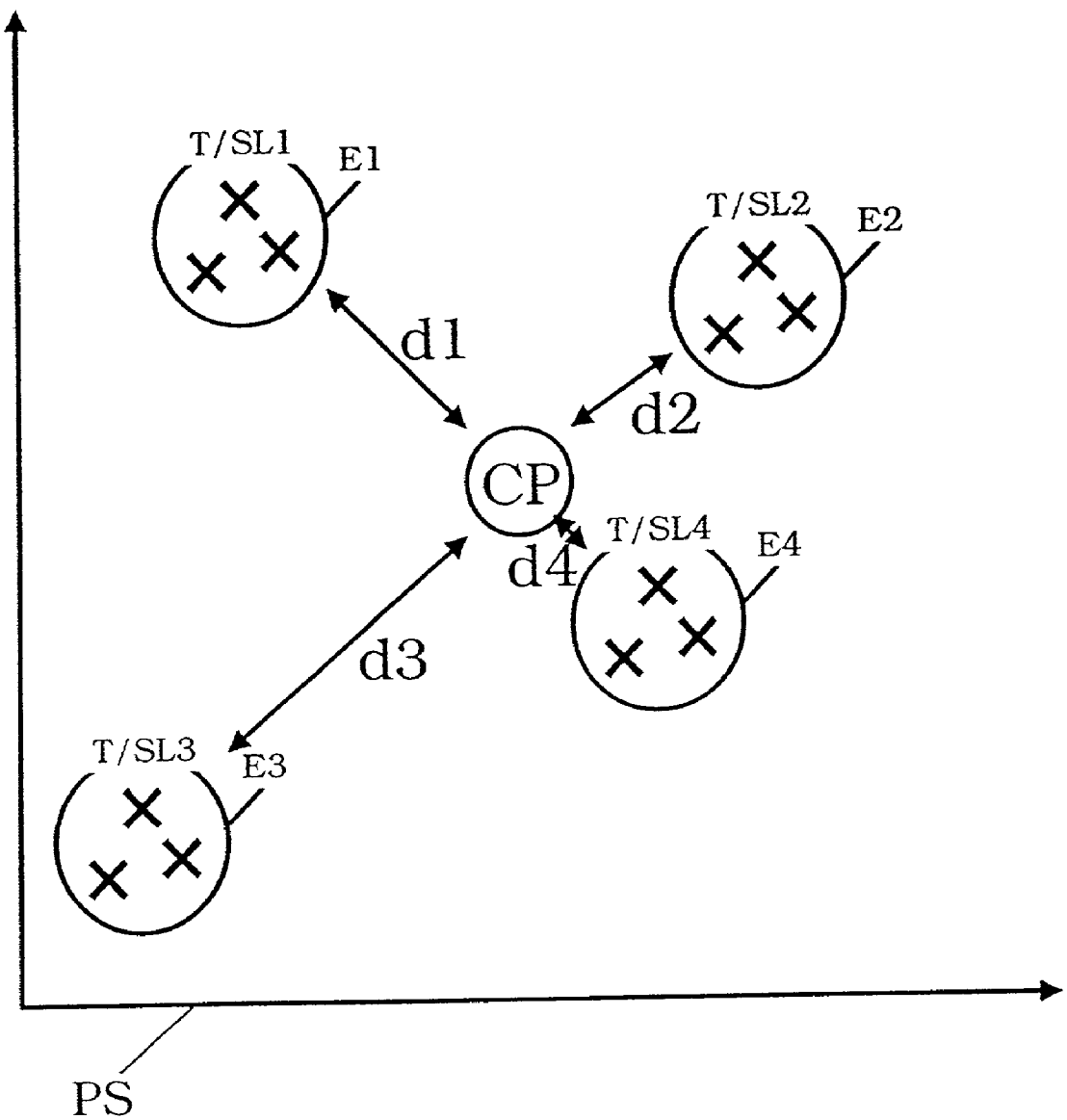
FIGS. 3,4 are diagrams showing constructions of approximative sets of pronunciation rules according to distinct embodiments of the invention.

FIG. 3 shows a different array of four Eigenpronunciations E1, . . . , E4. In the example of FIG. 3 the current pronunciation CP of the current speaker—which may also be the initial set of pronunciation rules IR of the example of FIG. 1—is projected into said pronunciation space PS, in particular in the center of the Eigenpronunciations E1, . . . , E4. As none of said Eigenpronunciations E1, . . . E4 coincides with the current pronunciation CP, the distances d1, . . . , d4 of these Eigenpronunciations E1, . . . , E4 have to be calculated. These distances d1, . . . , d4 are derived from a distance function or measure function which is defined in said pronunciation space PS.

After comparing the distance values d1, . . . , d4 in the example of FIG. 3 d4 is obtained as the lowest distance value. Accordingly, the assigned Eigenpronunciation E4 is the closest next neighbor of the current pronunciation CP. Therefore, E4 is chosen as the approximative set of pronunciation rules APR which fits best to the current pronunciation CP, as already indicated in the example of FIG. 1.

Figure 4:
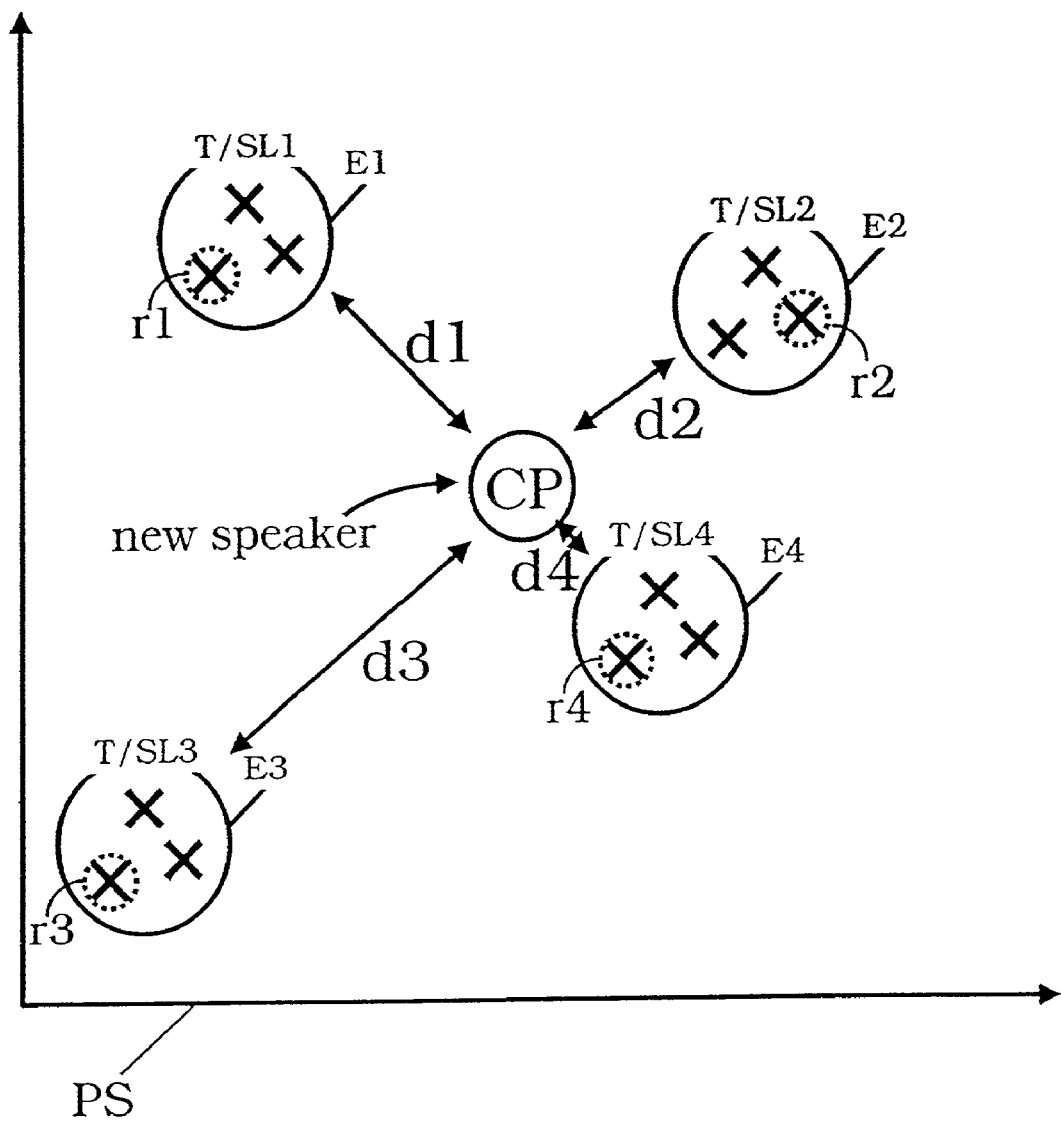

Finally FIG. 4 shows a further array of four Eigenpronunciations E1, . . . E4 in which several single or distinct rules r1, . . . , r4 are selected out of the sets of rules to describe the new speakers' pronunciation approximatively.

We claim:

1. Method for recognizing speech comprising the steps of:
providing a pronunciation space (PS) including possible pronunciation rules and/or sets thereof, wherein said pronunciation space (PS) includes an approximate set of pronunciation rules (APR) determined and/or generated in accordance with a current pronunciation (CP) of a current speaker, and
providing at least one current lexicon (CL) or a dictionary of pronunciation variants, which is employed for recognition, adapted to said current speaker by applying said approximate set of pronunciation rules (APR) to it, thereby including speaker specific pronunciation variants to said current lexicon (CL);
projecting said current pronunciation (CP) into said pronunciation space (PS);
calculating distance values (d1, . . . ,d4) with respect to Eigenpronunciations (E1, . . . ,E4); determining a lowest distance value (d4); and
choosing a set of pronunciation rules as said approximate set of pronunciation rules APR which correspond to the Eigenpronunciations (E4) being assigned to said lowest distance value (d4).

2. Method according to claim 1, wherein a step of adapting said current lexicon (CL) is carried out repeatedly, in particular after completed recognition steps and/or obtained recognition results.

3. Method according to claim 1, wherein a step of determining and/or generating said approximate set of pronunciation rules (APR) is carried out repeatedly, so as to iteratively find an approximate set of pronunciation rules (APR) fitting best to said current pronunciation (CP) and/or accent of said current speaker, in particular to consider temporal pronunciation and/or accent variations of said current speaker and/or in particular after completed recognition steps and/or obtained recognition results.

4. Method according to claim 1, wherein said pronunciation space (PS) is generated and/or provided in a preprocessing step, in particular in advance in a recognition process.

5. Method according to claim 1, wherein said pronunciation space (PS) is derived from a plurality and/or limited number of Eigenpronunciations.

6. Method according to claim 5, wherein said Eigenpronunciations are derived from, contain and/or are representative for certain and given pronunciation rules and/or sets thereof, in particular for at least one non-native speaker of at least one target language (TL) with at least one source language (SL) as a mother or native tongue or language of said current speaker.

7. Method according to claim 1, wherein said pronunciation space (PS) is modified during the process of recognition, in particular after completed recognition steps and/or obtained recognition results and/or in particular by modifying one or more Eigenpronunciations.

8. Method according to claim 1, wherein a step of determining and/or generating said approximate set of pronunciation rules (APR) comprises a step of determining a pronunciation-related position of said current speaker in said pronunciation space (PS), in particular in accordance with a current pronunciation (CP) and/or accent of said current speaker.

9. Method according to claim 1, wherein said approximate set of pronunciation rules (APR) is chosen as a given and specific set of pronunciation rules in said pronunciation space (PS), in particular as a given and specific Eigenpronunciation thereof, which is a next neighbor of the speaker's current pronunciation (CP), in particular with respect to a pronunciation-related position.

10. Method according to claim 9, wherein a property of being a next neighbor is evaluated by means of a certain given measure or distance function, in particular by an Euclidean distance, in said pronunciation space (PS).

11. Method according to claim 1, wherein said approximate set of pronunciation rules (APR) is chosen as a weighted mixture, superposition and given pronunciation rules, sets, derivatives, and/or components thereof in said pronunciation space (PS), in particular of one or more Eigenpronunciations.

12. Method according to claim 1, wherein said current lexicon (CL) is at least partially based on and/or derived from a starting lexicon (SL) or initial lexicon, in particular on a canonical lexicon essentially containing canonical pronunciation variants of native speakers of a given target language (TL) only and/or in particular in the case of changing to a different and/or new speaker.

13. Method according to claim 1, wherein a step of determining and/or generating said approximate set of pronunciation rules (APR) is at least partially based on and/or derived from a comparison of the current pronunciation (CP) with a canonical pronunciation, in particular with respect to a given utterance, recognition result and/or in particular in the beginning of a recognition session with a different and/or new speaker.

14. Method according to claim 13, wherein said comparison is essentially based on a recognition step using a starting or canonical lexicon (SL) as said current lexicon (CL).

15. Method according to claim 13, wherein for said comparison at least one recognition step is repeated using a phone or phoneme recognizer, so as to yield a sequence of actually uttered phones, phonemes.

16. Method according to claim 13, wherein for said comparison said current pronunciation (CP) of said current speaker is compared to a canonical pronunciation, in particular so as to generate an initial set of pronunciation rules (IR) and/or to locate the pronunciation-related position of said current speaker in said pronunciation space (PS).

17. Method according to claim 1, wherein from current lexicon (CL) recognition related information, pronunciation variants which are not covered by the speaking behavior and/or by the current pronunciation of the current speaker are removed, so as to decrease the amount of data to be evaluated.

18. Method according to claim 1, which is designed for a plurality of source languages (SL) and/or of target languages (TL), in particular with respect to one or more Eigenpronunciations.

19. System for recognizing speech, comprising:
  means for providing a pronunciation space (PS) including possible pronunciation rules and/or sets thereof, wherein said pronunciation space (PS) includes an approximate set of pronunciation rules (APR) determined and/or generated in accordance with a current pronunciation (CP) of a current speaker, and
  means for providing at least one current lexicon (CL) or a dictionary of pronunciation variants, which is employed for recognition, adapted to said current speaker by applying said approximate set of pronunciation rules (APR) to it, thereby including speaker specific pronunciation variants to said current lexicon (CL);
  means for projecting said current pronunciation (CP) into said pronunciation space (PS);
  means for calculating distance values (d1, . . . , d4) with respect to Eigenpronunciations (E1, . . . , E4);
  means for determining a lowest distance value (d4); and
  means for choosing a set of pronunciation rules as said approximate set of pronunciation rules APR which correspond to the Eigenpronunciations (E4) being assigned to said lowest distance value (d4).

* * * * *